(12) United States Patent
Douceur et al.

(10) Patent No.: US 8,135,987 B2
(45) Date of Patent: Mar. 13, 2012

(54) COLLECTION ORDERING FOR REPLICATED STATE MACHINES

(75) Inventors: John Douceur, Seattle, WA (US); Jonathan Howell, Seattle, WA (US); Jacob R. Lorch, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 105 days.

(21) Appl. No.: 12/793,547

(22) Filed: Jun. 3, 2010

(65) Prior Publication Data

US 2011/0302449 A1     Dec. 8, 2011

(51) Int. Cl.
*G06F 11/00* (2006.01)
(52) U.S. Cl. .............. 714/15; 714/4.11; 714/11; 714/13
(58) Field of Classification Search .................. 714/4.14, 714/11, 13, 151
See application file for complete search history.

(56) References Cited

U.S. PATENT DOCUMENTS

| | | | |
|---|---|---|---|
| 6,542,929 B1 | 4/2003 | Briskey | |
| 7,155,524 B1 * | 12/2006 | Reiter et al. | 709/229 |
| 7,334,154 B2 * | 2/2008 | Lorch et al. | 714/4.4 |
| 7,360,111 B2 | 4/2008 | Adya | |
| 7,454,521 B2 * | 11/2008 | Howell et al. | 709/238 |
| 7,849,223 B2 * | 12/2010 | Malkhi et al. | 709/248 |
| 2009/0150566 A1 | 6/2009 | Malkhi | |
| 2009/0313500 A1 | 12/2009 | Butterworth | |
| 2010/0017644 A1 | 1/2010 | Butterworth | |

OTHER PUBLICATIONS

Flexible Heterogeneous Strict Quorum-Based Dynamic Data Replication Schemes—Published Date: Dec 15, 2008.
Distributed Consensus with Process Failures—Published Date: 2007.
On the Availability of Non-strict Quorum Systems—Published Date: Oct. 11, 2005.
Zyzzyva: Speculative Byzantine Fault Tolerance—Published Date: Oct. 14, 2007.
"Zeno: Eventually Consistent Byzantine-Fault Tolerance" Author: Singh, et al. NSDI '09: 6th USENIX Symposium on Networked Systems Design and Implementation Published: 2009.
"The SMART Way to Migrate Replicated Stateful Services" Authors: Lorch, et al. Published: 2006 EuroSys'06, Apr. 18-21, 2006, Leuven, Belgium.

* cited by examiner

*Primary Examiner* — Charles Ehne

(57) ABSTRACT

A replicated state machine with N replica servers may be configured to tolerate a count of F faults. A first operation (of a first ordering type) executes when a first quorum of correctly functioning replicas is available. A second operation (also of the first operation type) executes when a second quorum of correctly functioning replicas is available. A third operation (of a second ordering type) executes when a third quorum of correctly functioning replicas are available. The operations are executed by the replicated state machine such that: (1) the replicated state machine does not guarantee operational ordering between the first operation and the second operation; (2) the replicated state machine guarantees ordering between the first operation and the third operation; and (3) the replicated state machine guarantees ordering between the second operation and the third operation.

20 Claims, 6 Drawing Sheets

COLLECTION ORDERING FOR REPLICATED STATE MACHINES

BACKGROUND

Network services or server systems, cloud services, etc. provide computing services to clients. For availability and performance, often such a service may be constructed with multiple servers or machines. The various machines may cooperate to maintain a state that is consistent with respect to the clients or applications that access the service. To this end, servers may each maintain a copy or replica of the state of the service, and updates by one server are applied or performed by the other servers. At some level, each machine is considered equivalent. That is, if each machine is running the same service software and maintaining the same state, each will provide the same output for the same input. This well-known type of system is often referred to as a replicated state machine (RSM). With an RSM, the functionality of a single server is duplicated among a set of some N replicas.

FIG. 1 shows a replication subsystem 100. The RSM in FIG. 1 includes three replica machines 102 which together form the RSM. In practice, many replica machines 102 may be used. The RSM may be implemented using the replication subsystem 100 (i.e., a framework or substrate). For discussion, the RSM may be considered to be the replicated service in combination with the replication subsystem 100. The replication subsystem 100 may perform various replication related functions for the RSM. For example, the replication subsystem 100 may deal with fault tolerance and operation ordering on behalf of the RSM. That is, an RSM, if built in a deterministic manner, may interface with the replication subsystem 100, which may in turn guarantee fault tolerance and operation ordering properties of the RSM when certain properties of the RSM hold true. Regarding the deterministic nature of a service, note that the service may need to be written as a deterministic state machine (a state machine in the classic computer science sense, e.g., with no random or non-deterministic behavior), where distribution of functionality of the servers 104 is left to the replication subsystem 100. In other words, a developer may write a complex state machine and need only be concerned with assuring that the service is constructed to be deterministic; the replication subsystem 100 will be accessed to transparently handle distribution, fault tolerance, and the like.

The replication subsystem 100 may be used as follows. From the perspective of an application developer, the developer writes an ordinary but deterministic server 104 and client 106, where the client 106 sends messages such as operation requests to the server 104, via a network, and the server 104 performs operations and sends reply messages. The replication subsystem 100 operates as local components on the servers and clients, i.e., each server replication component 108 is collocated with a server 104 and each client replication component 110 is collocated with a client 106. The components 108, 110 have respective application programming interfaces (APIs) that the servers 104 and clients 106 use to access the replication subsystem. When running as an RSM, there are multiple instances of the server 104, each sending and receiving updates via the replication subsystem 100 (in particular, by a local replication component 108 of the replication subsystem). A server's local server replication component 108 may maintain a shadow copy of the application state of its server 104. The replication subsystem components 108, 110 cooperate to provide an RSM while preserving the semantic of multiple clients accessing a single server. When a client 106 accesses the RSM, the client's client replication component 110 will communicate with various of the server replication components 108 on behalf of the client 106. When a server 104 performs an operation that affects the state of the RSM, the server's server replication component 108 will coordinate with other server replication components 108 to replicate the operation. As used herein, depending on the context, the term "replication subsystem" may refer to a client replication component 110, a server replication component 108, or both.

To provide fault tolerance, the replication subsystem 100 may implement a consensus protocol. When a client 106 submits an operation to the server system, the replica machines 102 first communicate according to a consensus protocol (via the server replication components 108) to establish the order in which the operation will execute relative to other operations received by the server system or RSM. Then, according to this consensus, the replicated servers 104 each separately execute the operation and the server replication components 108 send the corresponding results to the client machine 112 of the requesting client 106 (specifically, to the client replication component 110 on the client machine 112, which then provides the result to the client 106). It has been proven that, if certain conditions hold, the RSM as implemented by the replication subsystem 100 may experience faults and yet produce results that are identical to those of a single correctly functioning server. In particular, the ordering of all operations from various clients 106 is well defined. That is to say, some level of fault tolerance may be guaranteed by the replication subsystem 100 under some specific conditions.

RSM faults have been divided into two categories: stopping faults and Byzantine faults. By selecting a particular consensus protocol, an RSM can be configured to deal with a particular class of fault. A stopping fault occurs when a replica exits the RSM by loss of connectivity, machine failure, software failure, and so on. A consensus protocol able to handle such a fault is stopping fault tolerant (SFT). A Byzantine fault is a fault that occurs when a replica has failed in a way that renders its behavior incorrect. For example, a replica that has experienced Byzantine failure may produce random outputs, may continue to communicate via the consensus protocol in erroneous ways, may generate random messages, may stop, may act correctly, and so on. If the consensus protocol is not designed for Byzantine fault tolerance, Byzantine faults may cause replicas to become corrupt and clients may in turn become corrupt or fail. However, if a properly functioning Byzantine fault tolerant (BFT) consensus protocol is used, the state of the replicas that have not experienced Byzantine failure will remain consistent and correct, meaning they will advance in the way a single correct machine would advance, and the responses that all clients see will be correct. An example of an SFT consensus protocol was described in a paper titled "The SMART Way to Migrate Replicated Stateful Services" (Jacob R. Lorch, Atul Adya, William J. Bolosky, Ronnie Chaiken, John R. Douceur, and Jon Howell, in the Proceedings of EuroSys 2006). An example of a BFT consensus protocol was described in a paper titled "Practical Byzantine Fault Tolerance" (Miguel Castro and Barbara Liskov, in the Proceedings of the Third Symposium on Operating Systems Design and Implementation (OSDI) '99).

In practice, a client replication component 110 may obtain messages from all replicas, but, if implementing a BFT consensus protocol, will know how to handle corrupt replies and will give the client a single-machine consistent view. For example, a BFT client replication component 110 may resolve conflicting replies from replicas by following a majority of equivalent replies. In sum, if a replica server 104 enters a Byzantine failure state and erroneous or nonsensical messages are received by a client machine 112, the client 106 application above the BFT replication subsystem 100 will see only sane and consistent messages.

As mentioned, an RSM may be guaranteed to tolerate faults under certain conditions (e.g., limited failure), and in practice this may involve the replication subsystem 100 implementing a consensus protocol. The consensus protocol conditionally guarantees operation ordering, meaning that if a first client 106 submits operation1 and a second client 106 submits operation2, and assuming that the fault tolerance conditions are true, either operation1 will be applied to the RSM before operation2, or operation2 will be applied to the RSM before operation1. In either case, there is a strict order in which the operations are applied. This type of ordering property is sometimes referred to as classic ordering, strict ordering, or strong ordering. It has been proven that an RSM configured with an SFT consensus protocol can guarantee ordering and tolerate stopping faults only under the condition that the count of replicas N is greater than or equal to 2F+1, where F is the count of faults. It has also been proven that an RSM configured to tolerate Byzantine faults can guarantee ordering only under the condition that N is greater than or equal to 3F+1.

While SFT and BFT strong ordering guarantees are useful, a previous BFT consensus protocol added unordered or so-called weak operations. That is, this previous consensus protocol provided two types of operation: strong and weak operations. A strong operation, when submitted by a client, is a classic BFT well-ordered operation as described in the preceding paragraph, meaning that when a client submits a strong operation, if enough replica machines are available, the operation completes, strict ordering is guaranteed relative to other strict operations, and the client gets an answer to that effect. If not enough machines are available, the operation fails and is not performed by the RSM. A weak operation was devised that may guarantee replication (i.e., the operation will be applied to the RSM) but does not guarantee ordering with respect to other weak operations or with respect to strong operations. Weak operations are more tolerant of faults. That is, a weak operation needs fewer machines than a strong operation needs to form a sufficient consensus. In practice, however, perhaps due to lack of any ordering guarantees, weak operations have limited practical application. Furthermore, while the strict ordering guarantees of classic BFT and SFT consensus protocols have been established by highly complex and rigorous mathematical proofs, it is possible that such guarantees have not been conclusively proven for the strong-and-weak approach.

Embodiments described herein relate to fault tolerant consensus protocols and implementation thereof.

SUMMARY

The following summary is included only to introduce some concepts discussed in the Detailed Description below. This summary is not comprehensive and is not intended to delineate the scope of the claimed subject matter, which is set forth by the claims presented at the end.

A replicated state machine with N replica servers may be configured to tolerate a count of F faults. A first operation (of a first ordering type) executes when a first quorum of correctly functioning replicas is available. A second operation (also of the first operation type) executes when a second quorum of correctly functioning replicas is available. A third operation (of a second ordering type) executes when a third quorum of correctly functioning replicas is available. The operations are executed by the replicated state machine such that: (1) the replicated state machine does not guarantee operational ordering between the first operation and the second operation; (2) the replicated state machine guarantees ordering between the first operation and the third operation; and (3) the replicated state machine guarantees ordering between the second operation and the third operation.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments described herein may provide BFT or SFT consensus protocols that provide operations of varying ordering strictness (i.e., different ordering types may be implemented). From weakest to strongest ordering guarantees, these operations or ordering types will be referred to as: collection-including (CI) operations, classic strict ordering (SO) operations, and collection-completing (CC) operations. Collection-including operations are not ordered with respect to other collection-including operations, are not ordered with respect to strict-ordering operations, but are ordered with respect to collection-completing operations. Strict-ordering operations are ordered with respect to each other and with respect to collection-completing operations, but are not ordered with respect to collection-including operations. Collection-completing operations are ordered with respect to each other, are ordered with respect to strong-ordering operations, and are ordered with respect to collection-including operations. Moreover, as will be described, these operations may be implemented on top of existing classic BFT and SFT consensus protocols, and therefore may have the same well proven fault-tolerant guarantees.

Fundamentally, consensus protocols work by employing a principle known as quorum overlap. A quorum is a set of replicas that agree to perform a given operation. Any two quorums performing different respective operations for the RSM must have at least a minimum count of replicas in common, the count depending on the type of fault to be tolerated. For the case of stopping faults, this minimum overlap is 1 replica, and for the case of Byzantine faults, this minimum is F+1 replicas. An easy and common way to achieve the necessary overlap property is by defining quorums based on size. A classic SFT consensus protocol uses a quorum size of ceiling((N+1)/2), which ensures that any two quorums overlap by at least 1 replica; for N=2F+1, this quorum size is equal to F+1. A BFT consensus protocol (for basic ordering) uses a quorum size of ceiling((N+F+1)/2), which ensures that any two quorums overlap by at least F+1 replicas;

for N=3F+1, this quorum size is equal to 2F+1. These quorums are for strict-ordering operations.

Problem Of Unavailability

Figure 1:
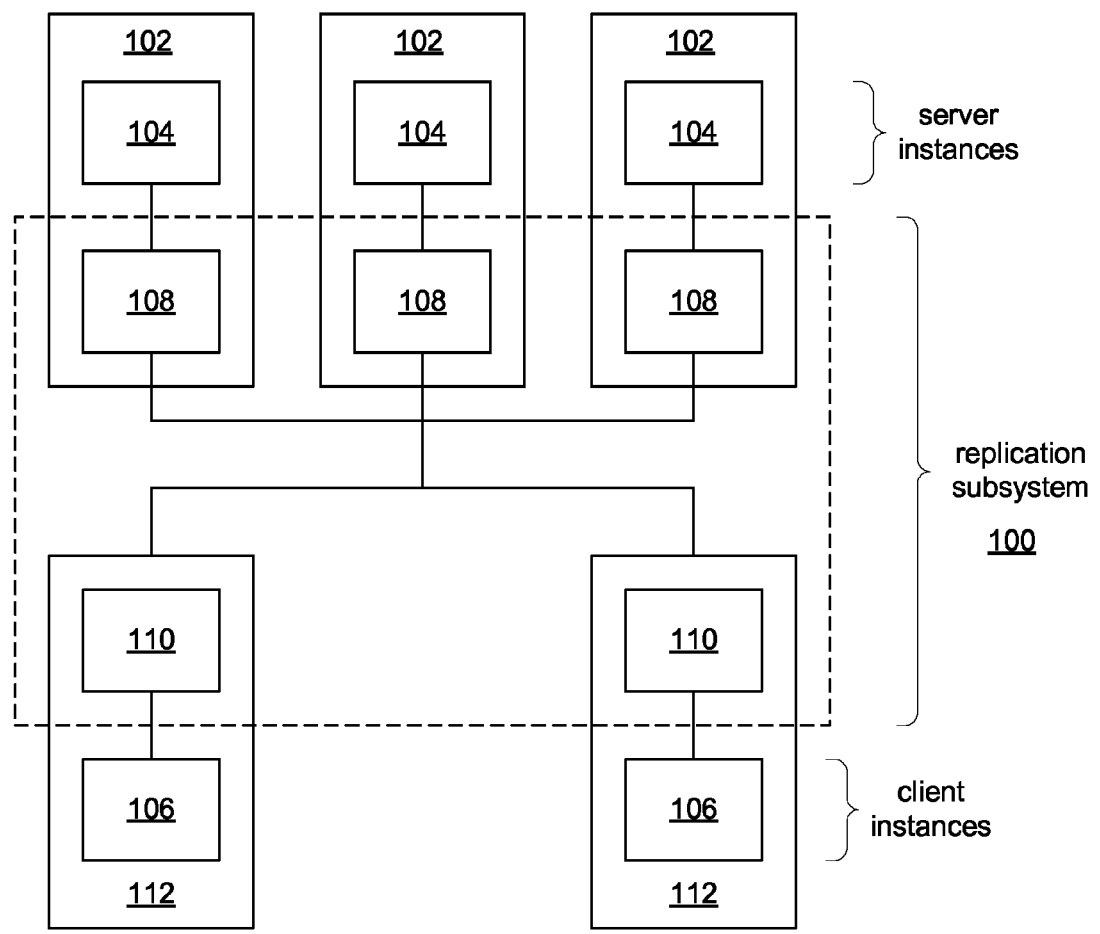
FIG. 1 shows a replicated state machine, including a replication subsystem.
Figure 2:
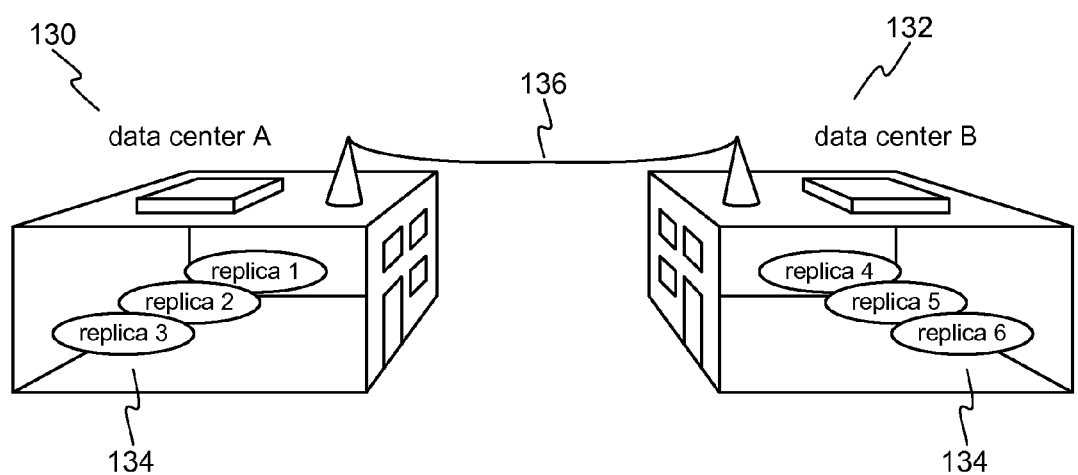
FIG. 2 shows two data centers.

Under some conditions, it may not be possible to form a strict-ordering quorum. FIG. 2 shows two data centers 130, 132. The data centers house each house 3 replicas 134 of an RSM of N=6. If the connection 136 between the two data centers 130 and 132 is lost, the system or RSM will become partitioned, causing a condition in which there are insufficient replicas 134 in each data center to perform a consensus for a strict-ordering operation. That is, there will be no overlap between the set of three replicas 134 of data center A 130 and the set of three replicas 134 of data center B 132. Even if each data center 130, 132 can still communicate with clients 134 that are nearby, the server system or RSM might not be able to proceed.

For such a scenario (but without limitation thereto), two classes of operation can be implemented: collection-including and collection-completing. Collection-including operations can proceed even when a strict-ordering quorum is not available, because such operations do not require ordering with respect to each other. For example, this type of operation might be acceptable for placing a bid in a second-price auction. Every collection-completing operation (e.g., closing an auction) is guaranteed to be ordered with respect to every collection-including operation that has been previously performed.

To facilitate these ordering types or classes of operation, two new types of quorum may be implemented using a consensus protocol: collection-including quorums and collection-completing quorums. A collection-including operation can execute whenever a collection-including quorum of correctly functioning replicas is available, and a collection-completing operation can execute whenever a collection-completing quorum of correctly functioning replicas is available. The size of a collection-including quorum will be termed $Q_{CI}$ and the size of a collection-completing quorum will be termed $Q_{CC}$. The quorums are established such that every collection-including quorum satisfies the quorum overlap property with respect to every collection-completing quorum, even though two collection-including quorums might not satisfy the quorum overlap property with respect to each other. For classic SFT consensus, this overlap is at least 1 replica, and for BFT consensus, this overlap is at least F+1 replicas.

As mentioned above, one way to achieve the necessary overlap property is by defining quorums based on size. The quorum sizes mentioned earlier may be used. For either form of consensus, the collection-completing quorum size $Q_{CC}$ can be no greater than N−F, because the protocol must be able to continue to work when F replicas are faulty. To ensure the appropriate overlap, collection-including quorums in a classic SFT consensus protocol are of size F+1, and collection-including quorums in a BFT consensus protocol are of size 2F+1. It will readily be seen that these sizes are the same as those of strict-ordering quorums when the count of replicas is set to its traditional value (N=2F+1 for stopping faults, N=3F+1 for Byzantine faults). Note that benefits of consensus protocols with collection-including and collection-completing operations may increase as N increases.

The example of FIG. 2 is an RSM in which N=6 and F=1. Consider a scenario in which this system is configured to tolerate stopping faults. The designation of F=1 means that the system must tolerate up to 1 fault, but in fact this system can tolerate up to 2 faults in normal operation, because the strict-ordering quorum size is 4. In other words, the system can execute strict-ordering operations even when two replicas 134 are faulty. If connection 136 is severed, each data center 130, 132 is left with 3 server replicas 134. Neither data center partition has sufficient server replicas 134 to perform strict-ordering operations or collection-completing operations. However, because the collection-including quorum size is 2, each data center 130, 132 has enough server replicas 134 to continue independently executing collection-including operations, and in fact each data center can tolerate a single stopping fault and still guarantee the ordering properties of the collection-including operations. When the network connection 136 is restored, any set of 5 non-faulty server replicas 134 can perform a collection-completing operation, because the collection-completing quorum size is 5. Note that when there is no partition, the system is able to perform collection-completing operations while tolerating F=1 faulty replica.

Now consider a scenario in which the RSM system of FIG. 2 is configured to tolerate Byzantine faults. The designation of F=1 means that the system must tolerate up to 1 fault, but in fact this system can tolerate up to 1 Byzantine fault and 1 stopping fault in normal operation, because the strict-ordering quorum size is 4. In other words, the system can execute strict-ordering operations even when one server replica 134 is Byzantine faulty and one server replica 134 has stopped. If the network connection 136 is disabled, each data center 130, 132 is left with three replicas. Because the collection-including quorum size is three, each data center 130, 132 has enough servers to continue independently executing collection-including operations. When the network connection 136 is restored, any set of 5 non-faulty server replicas 134 can perform a collection-completing operation (which will be ordered relative to collection-including operations received during the partition), because the collection-completing quorum size is 5. When there is no partition, the RSM system is able to perform collection-completing operations while tolerating F=1 faulty replica.

In some applications, there is no need for collection-including or collection-completing operations, as it may be better to disallow service than to perform operations incorrectly. For instance, in a banking application, it would be undesirable for two data centers to both perform a withdrawal of $1000 from an account that contains only $1000, because the account will be overdrawn. However, in some applications, it may be acceptable to allow some forms of service to continue. For instance, in a second-price auction, it is acceptable for two disconnected data centers to both accept bids on a single item (a collection-including operation). On the other hand, it would not be acceptable for the two data centers to both declare winners of the auction (a collection-completing operation).

Figure 3:
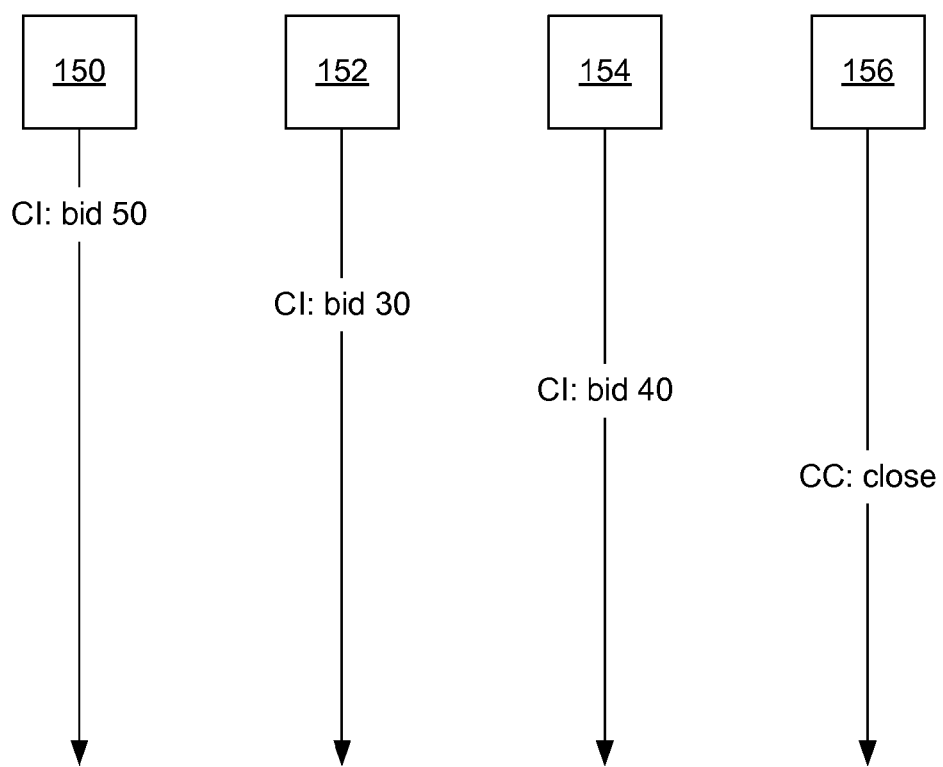
FIG. 3 shows a sequence of example operations.

FIG. 3 shows a sequence of example operations. Various clients 150, 152, 154, 156 submit operations in an RSM that implements an auction. Client 150 submits a collection-including operation of a bid with value 50. Clients 152 and 154 submit collection-including operations that are bids of 30, and 40, respectively. At this point, assuming the consensus protocol conditions have been met, the bids are all guaranteed to be correctly applied to the RSM, and are guaranteed to be correctly ordered with respect to any collection-completing operations, but the bids are not guaranteed to be ordered with respect to each other. For example, client 150 might see a result of its bid that does not reflect a prior bid from client 152, and client 152 might see a result of its bid that does not reflect a prior bid from client 150. Not only may updates applied out of order of receipt, updates may be applied in any order with respect to each other. Nonetheless, when a client 156 (or server acting as a client) submits a collection-completing operation of closing the auction, any collection-including bid operation that was reported to the client as having been accepted is guaranteed to be included in the result of the collection-completing operation.

Implementation

Figure 4:
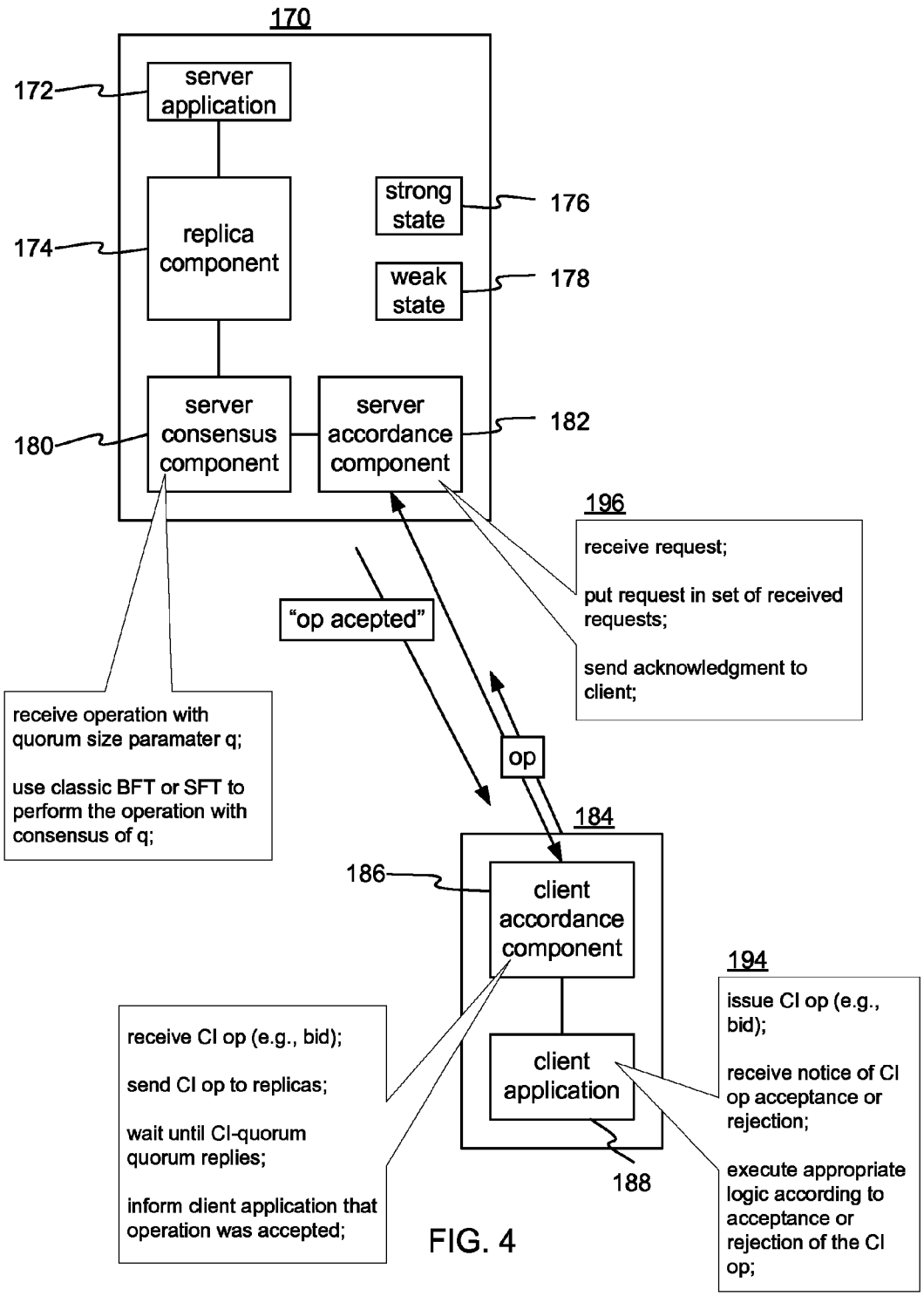
FIG. 4 shows a system for implementing an RSM consensus protocol.

FIG. 4 shows a system for implementing an RSM consensus protocol. The RSM may include any number of servers and clients. An example RSM or server machine 170 may include a server application 172, a replica component 174 managing strong state 176 and weak state 178 data, a server consensus component 180, and a server accordance component 182 operating on top of the consensus component 180. A client machine 184 may include a client accordance component 186 used by a client application 188.

Figure 5:
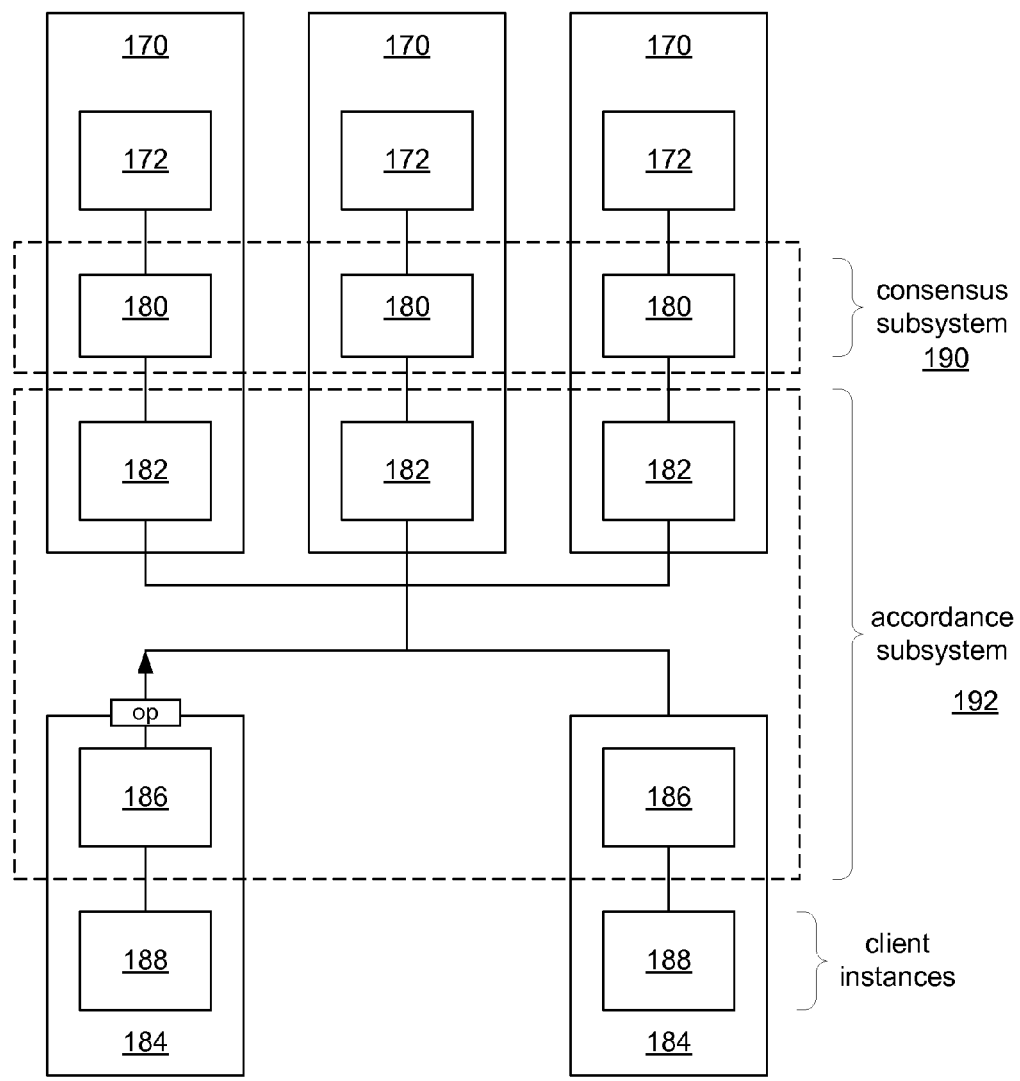
FIG. 5 shows a consensus subsystem and an accordance subsystem used by the RSM system.

FIG. 5 shows a consensus subsystem 190 and an accordance subsystem 192 used by the RSM system. The consensus subsystem 190 is comprised of cooperating server consensus components 180 on various server machines 170. The accordance subsystem 192 is comprised of the server accordance components 182 and the client accordance components 186.

The consensus subsystem 190 may implement a known consensus protocol (either BFT or SFT), modified to provide a parameterized quorum size. Prior consensus protocols use hard-coded quorum sizes. Any known consensus protocol may be trivially revised to allow an incoming operation to specify a quorum size. That is, a server consensus subsystem 190 may implement an API or protocol in which quorum size may be specified externally by the entity invoking the consensus subsystem 190. The consensus subsystem 190 (server consensus component 180) receives the quorum size and implements the requested operation by requiring a quorum of the specified size. In sum, the consensus subsystem 190 implements an RSM collection-ordering consensus protocol (either BFT or SFT). In either case, the server consensus components 180 are designed to allow the accordance subsystem 192 to specify the size of a quorum. As the semantics of the consensus protocol are not reduced from those of prior proven consensus protocols, the proven properties thereof hold true.

The accordance subsystem 192 allows a client accordance component 186 to know that a given count (M) of replicas have agreed to accept its request, and therefore, depending on the value of M, the corresponding client application 188 can be informed that a given type of requested operation has been accepted. In one embodiment, the accordance subsystem 192 implements a collection-including operation as follows, with reference to FIG. 4. On client machine 184, a process 194 starts a client application 188 issuing a completion-including operation to its client accordance component 186, which sends the requested collection-including operation to all replicas possible and waits for acknowledgements from at least M of them (as appropriate for the fault type). When a server accordance component 182 receives a request, it stores the operation in a set of received requests—the weak state 178 data—and sends an acknowledgement to the requesting client machine 184's accordance component 186.

When collection-including operations are submitted (e.g., auction bids), various of the replicas have received and acknowledged the operations and stored the operations in their weak state 178 data sets. When a client performs a collection-completing operation (e.g., a close-auction operation), at least N−F of the replicas each initiate a strict-ordering operation using the underlying consensus subsystem 190 with a quorum size of N−F. This set of at least N−F strict-ordering operations ensures that the replicas are in sync regarding the pending collection-including operations, as described in the following. The collection-completing operation is held while the N−F strict-ordering operations are executed, and the replicas thereby exchange the collection-including operations in their weak state 178 data sets. When a sufficient number of replicas have applied the outstanding collection-including operations (e.g., 5 out of 6), the collection-completing operation is then performed (e.g., the auction is closed). In other words, when a collection-completing operation starts, N−F strong operations are performed, each strong operation being an operation that carries out some of the collection-including operations. Consider the following example.

Client1 submits a bid of 30, client2 a bid of 50, and client3 a bid of 20, and there are 6 replicas (R1-R6). Client1's bid is accepted by replicas R2 and R5; client2's bid is accepted by replicas R2, R3, and R4; and client3's bid is accepted by replicas R5 and R6. Because each client operation was accepted by at least F+1 replicas, each client is assured that its bid will be included in the result of the auction. A collection-completing operation issues and there are 6 replicas (R1-R6). Replica R1 receives the collection-completing operation, finds nothing in its weak state data, and reports there is nothing to add. At this point, the RSM's logical state has an indication that R1 submitted its collection-including operations and that the collective (RSM-wide) set of collection-including operations is empty. Then, replica R2 performs the auction-closing operation. Replica R2 has two bids (30 and 50) and sends the operation to the other replicas which perform the operation. At this point, the RSM has a logical state that it has heard from R1 and R2 (for example, a "heardfrom" list may include R1 and R2), and the collective bid list includes 30 and 50. Replica R3 has a bid of 50, and the replicas perform the bid. The "heardfrom" list now includes R1, R2, and R3, and the bidlist set is unchanged (because adding an existing member to a set has no effect on the set). Replica R4 was in a same state as R3 and when it is finished the "heardfrom" list includes R1, R2, R3, and R4, and the bidlist is unchanged. Assuming that R5 fails, R6 has a bid of 20, which R1, R2, R3, and R4 apply. Now, the RSM logical state indicates that R1, R2, R3, R4, and R6 have been heard from. Having a sufficient quorum, the replicas all perform the collection-completing operation (closing the auction). Even though R5 failed, the auction completed. None of the collection-including operations were lost because every collection-including operation was performed by a collection-including quorum (value of 2). Even though 1 replica was lost it is guaranteed that its collection-including operations were not lost because each was received by at least one other replica.

To explain further, the overlap property of the underlying consensus subsystem 190 provides the fault tolerance for the various operation types. In the example, a bid was not lost because only 1 machine failed, and the choice of the numbers for a collection-completing quorum size, a collection-including quorum size, and an amount of overlap between them were set to make sure that operations were not lost. In the case of stopping failures, an overlap of 1 is enough. For Byzantine failures, the overlap must be F+1. Note that if there are no more than F failures, if there is always an overlap of at least F+1 there is at least one correct replica machine in the overlap set. While the base implementation of a consensus subsystem may start with a known consensus protocol, various quorum sizes as discussed above may maintain the quorum overlap property according to the type of operation. The collection-including quorum size may be sufficient for ordering properties of collection-including operations but may be too small to maintain sufficient overlap for other types of operations. The collection-completing quorum size should be large enough to allow sufficient quorum overlap between a quorum having a collection-including size and a quorum having a collection-completing size.

Regarding the accordance subsystem, other embodiments to perform the accordance-forming process are possible. For example, the client might not send requests to all replicas initially; instead, the client might contact only M replicas and then contact more if fewer than M reply in a timely fashion. As another example, the client might send a request to a single replica, making that single replica responsible for relaying the request to other replicas, and if the client does not receive M replies in a timely fashion, it resends its request to another replica.

Figure 6:
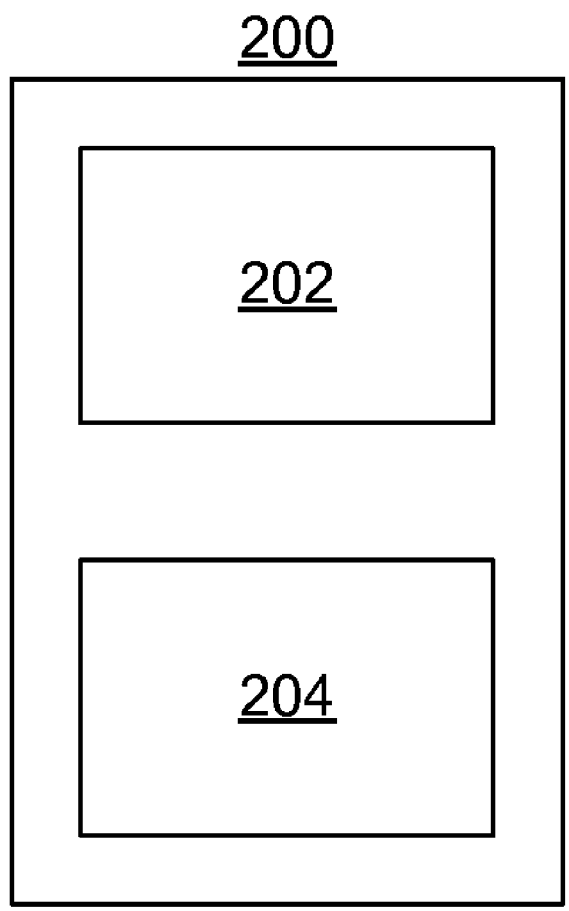
FIG. 6 shows an example computer.

FIG. 6 shows an example computer 200. The computer 200 may have storage 202 and processor(s) 204. The storage 202 may include any combination of volatile or non-volatile memory, recording media, disk drives, removable media, or any other current or future devices that are used to store computer software in various forms. The processor(s) 204 work in cooperation to perform operations stored in the storage 202, store results in the storage 202, and so on.

Conclusion

Embodiments and features discussed above can be realized in the form of information stored in the storage 202. The stored information can be in the form of machine executable instructions (e.g., compiled executable binary code), source code, bytecode, or any other information that can be used to enable or configure computing devices to perform the various embodiments discussed above. This is also deemed to include at least volatile memory such as RAM and/or virtual memory storing information such as CPU instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A replicated state machine comprising:
N replica servers, the replicated state machine configured to tolerate a count of F faults, wherein a first operation executes when a first quorum of correctly functioning replicas are available, a second operation executes when a second quorum of correctly functioning replicas are available, and a third operation executes when a third quorum of correctly functioning replicas are available, where the operations are executed by the replicated state machine such that:
the replicated state machine does not guarantee operational ordering between the first operation and the second operation;
the replicated state machine guarantees ordering between the first operation and the third operation; and
the replicated state machine guarantees ordering between the second operation and the third operation.

2. A replicated state machine according to claim 1, wherein quorums are defined by quorum size, such that the first quorum and second quorum are each quorums of a size designated by a collection-including quorum size, and the third quorum is of a size designated by a collection-completing quorum size.

3. A replicated state machine according to claim 2, wherein the faults comprise stopping faults, the collection-including quorum size is F+1, the collection-completing quorum size is N−F, and N≧2F+1.

4. A replicated state machine according to claim 2, wherein the faults comprise Byzantine faults, the collection-including quorum size is 2F+1, the collection-completing quorum size is N−F, and N≧3F+1.

5. A replicated state machine according to claim 1, wherein a fourth operation executes when a fourth quorum of correctly functioning replicas are available, and a fifth operation executes when a fifth quorum of correctly functioning replicas are available, and wherein the fourth and fifth operations are executed by the replicated state machine such that:
the replicated state machine does not guarantee ordering between the first operation and the fourth operation;
the replicated state machine does not guarantee ordering between the first operation and the fifth operation;
the replicated state machine does not guarantee ordering between the second operation and the fourth operation;
the replicated state machine does not guarantee ordering between the second operation and the fifth operation; and
the replicated state machine guarantees ordering between the fourth operation and the fifth operation, between the third operation and the fourth operation, and between the third operation and the fifth operation.

6. A replicated state machine according to claim 5, wherein quorums are defined by quorum size, such that the first quorum and second quorum are each quorums of a size designated by a collection-including quorum size, the third quorum is of a size designated by a collection-completing quorum size, and the fourth and fifth quorums are each defined by a strict-ordering quorum size.

7. A replicated state machine according to claim 6, wherein the faults comprise stopping faults, the collection-including quorum size is F+1, the collection-completing quorum size is N−F, the strict-ordering quorum size is ceiling((N+1)/2), and N≧2F+1.

8. A replicated state machine according to claim 6, wherein the faults comprise Byzantine faults, the collection-including quorum size is 2F+1, the collection-completing quorum size is N−F, the strict-ordering quorum size is ceiling((N+F+1)/2), and N≧3F+1.

9. A method performed by a replicated state machine comprised of a plurality of replica server computers, wherein each replica server maintains its own copy of the state of the replicated state machine, and where operations submitted to the replicated state machine are replicated on varying quorums of the replica servers, the method comprising:
receiving a first plurality of operations, and guaranteeing that the first plurality of operations will all be applied to the replicated state machine despite faults that prevent the replicated state machine from applying the first plurality of operations to each replica server, wherein the first plurality of operations are all of a first ordering type, the first ordering type such that operations of the first ordering type are not guaranteed to be applied to the replicated state machine in a consistent order;
receiving a second plurality of operations, and guaranteeing that the second plurality of operations will all be applied to the replicated state machine despite faults that prevent the replicated state machine from applying the second plurality of operations to each replica server, wherein the second plurality of operations are all of a second ordering type, the second ordering type such that operations of the second ordering type are guaranteed to be applied to the replicated state machine in a consistent order, and each operation of the first type is guaranteed to be applied in a consistent order with respect to operations of the second type.

10. A method according to claim 9, wherein the faults comprise faults of a type where a replica server sends messages that conflict with other replica servers.

11. A method according to claim 9, wherein when the replicated state machine is partitioned into a first set of replica servers and a second set of replica servers, where the first set of replica servers remain in communication with each other but not with the replica servers in the second set, and the second set of replica servers remain in communication with each other but not with the replica servers in the first set, and while partitioned, each set informs clients that operations of the first type have been accepted but does not inform clients that operations of the second type have been accepted.

12. A method according to claim 11, wherein the replicated state machine ceases to be partitioned and the replica servers of the first set can communicate with the replica servers of the second set, and when a second operation is received, operations accepted during the partition are applied to the replicated state machine and then the second operation is applied to the replicated state machine.

13. A method according to claim 11, wherein when a replica server receives a first operation it accepts the first operation by storing the first operation and transmitting an acceptance acknowledgment.

14. A method according to claim 9, further comprising:
receiving a third plurality of operations, and guaranteeing that the third plurality of operations will all be applied to the replicated state machine despite faults that prevent the replicated state machine from applying the third plurality of operations to each replica server, wherein the third plurality of operations are all of a third ordering type, the third ordering type such that operations of the third ordering type are guaranteed to be applied to the replicated state machine in a consistent order with respect to each other and with respect to operations of the second type.

15. One or more computer-readable storage media storing information to enable server devices to implement a replicated state machine that replicates its state on each of the server devices, the server devices performing a process comprising:

executing an implementation of a fault tolerant consensus protocol, the fault tolerant consensus protocol specifying first operations and second operations, where the first operations are ordered with respect to second operations and are not ordered with respect to each other, where the second operations are ordered with respect to each other and are ordered with respect to the first operations, where each first operation must be performed by a quorum of at least Q1 server devices and each second operation must be performed by a quorum of at least Q2 server devices.

16. One or more computer-readable storage media according to claim 15, wherein the fault tolerant consensus protocol comprises a Byzantine fault tolerant protocol such that, for a given number of Byzantine faults, Q1 is greater than twice the number of Byzantine faults, and Q2 is at least as large as the difference between the number of replica servers and the number of Byzantine faults.

17. One or more computer-readable storage media according to claim 15, wherein the consensus protocol specifies third operations that are ordered with respect to each other and with respect to the second operations, but are not ordered with respect to the first operations.

18. One or more computer-readable storage media according to claim 15, the process further comprising storing some of the first operations on the replica servers as they are received and then applying them to the replicated state machine in response to receiving one of the second operations.

19. One or more computer-readable storage media according to claim 15, the process further comprising responding to at least Q2 of the replica servers performing the some of the first operations by performing the one of the second operations.

20. One or more computer-readable storage media according to claim 15, wherein the implementation of the consensus protocol comprises a quorum variable and when a first or second operation is performed either Q1 or Q2 is communicated to the implementation via the quorum variable.

* * * * *